Feb. 24, 1942.   F. W. ELY ET AL   2,273,848
INDICATING DEVICE
Filed June 21, 1939   3 Sheets-Sheet 1
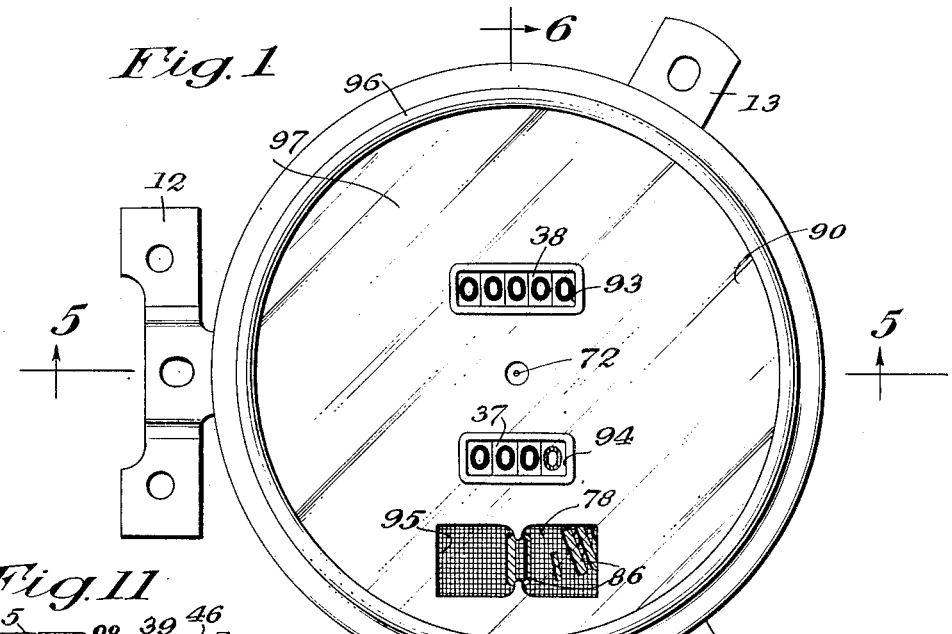
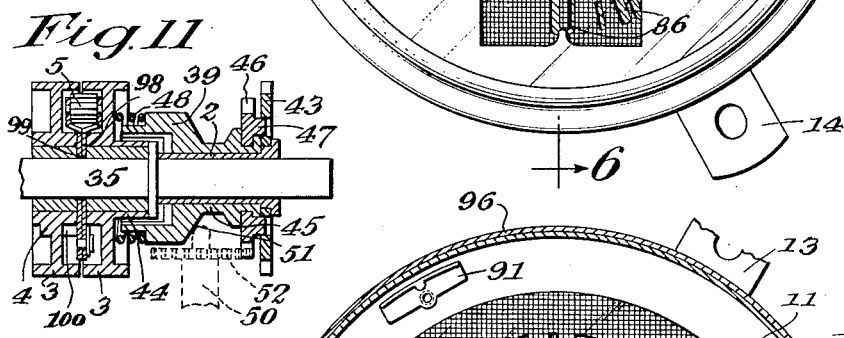
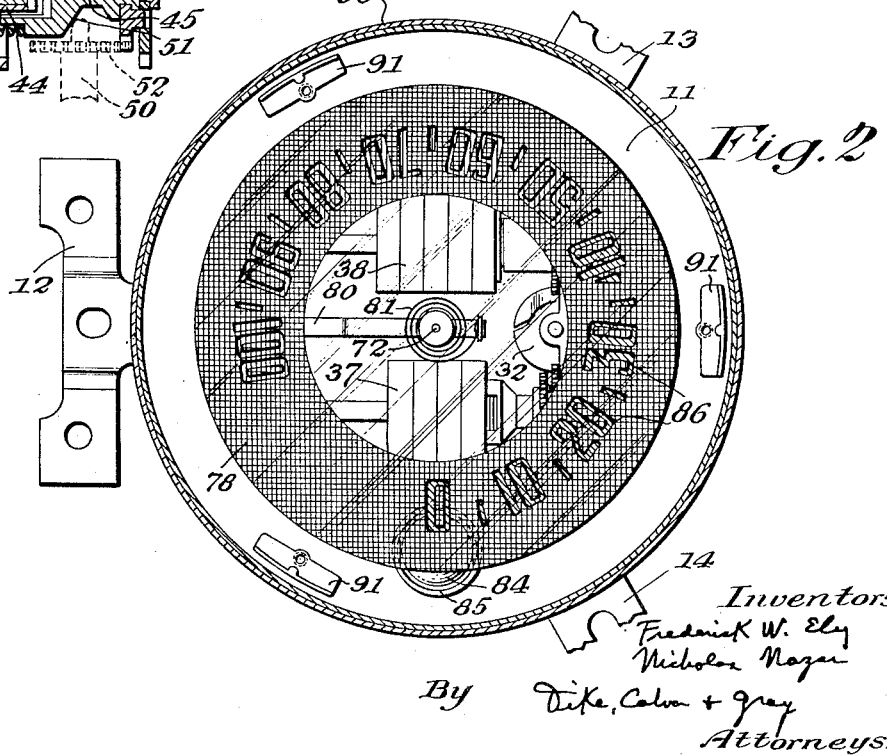
Inventors:
Frederick W. Ely
Nicholas Mazer
By Dike, Calver & Gray
Attorneys.

Feb. 24, 1942.  F. W. ELY ET AL  2,273,848
INDICATING DEVICE
Filed June 21, 1939  3 Sheets-Sheet 2

Inventors:
Frederick W. Ely
Nicholas Nazar
By Dike, Calver & Gray
Attorneys.

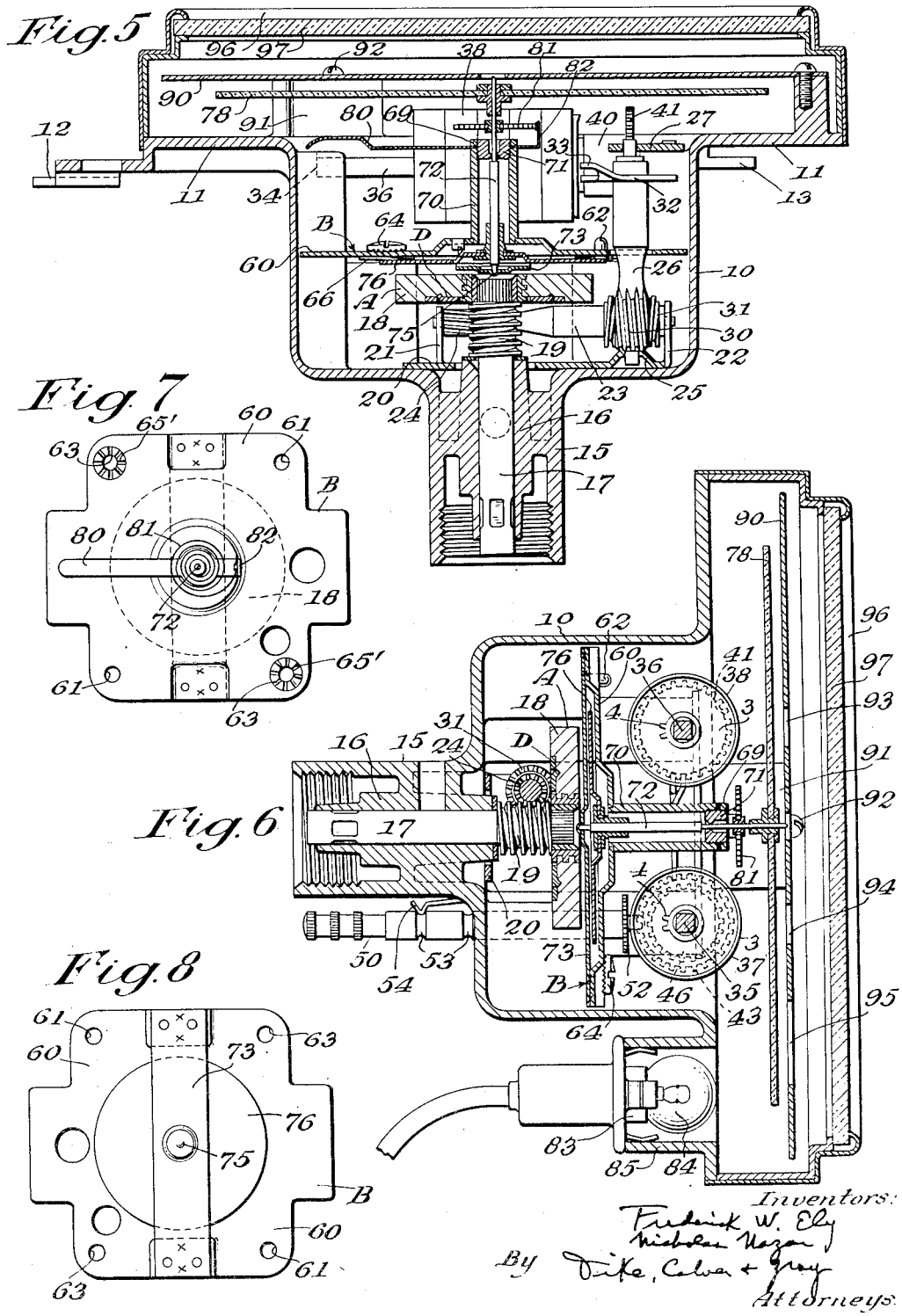

Patented Feb. 24, 1942

2,273,848

UNITED STATES PATENT OFFICE 2,273,848

INDICATING DEVICE

Frederick W. Ely, Weston, and Nicholas Nazar, Boston, Mass., assignors to Waltham Watch Company, Waltham, Mass., a corporation of Massachusetts Application June 21, 1939, Serial No. 280,356

9 Claims. (Cl. 264—13)

This invention relates to indicating devices.

The invention has for one object the provision of various features of design and construction which makes possible the production of a high class, reliable instrument of this character at a minimum cost.

It is another object of the invention to provide an instrument of this general character which is so constructed that an accurate calibration of the speed-indicating means may be easily and quickly obtained.

A further object of the invention is to provide an instrument of this general character having illuminated speed-indicating means.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

The invention will be more clearly understood from the following description in conjunction with the accompanying drawings, in which:

Fig. 1 is a front view of a speedometer embodying the invention;

Figs. 2, 3 and 4 are similar views with some of the parts removed;

Figure 3:
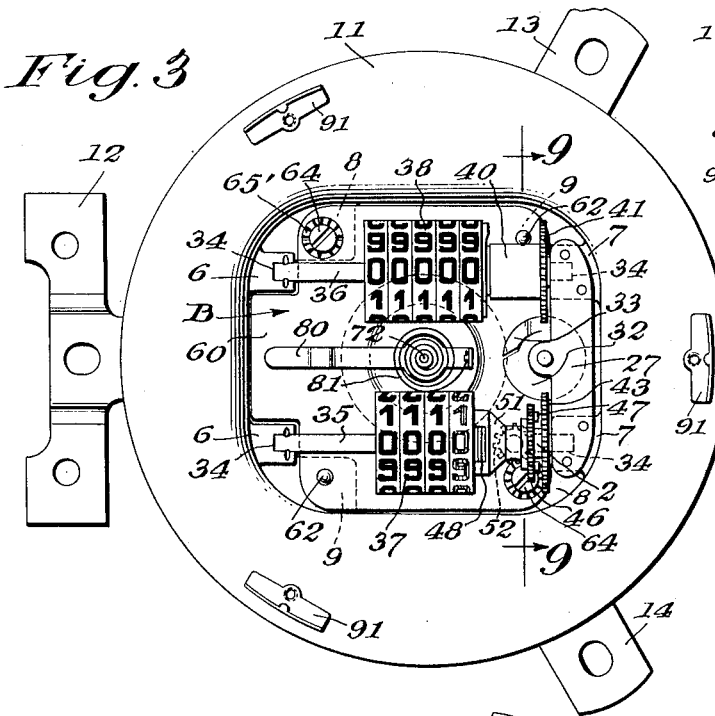
Figure 10:
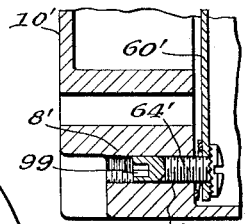
Figure 4:
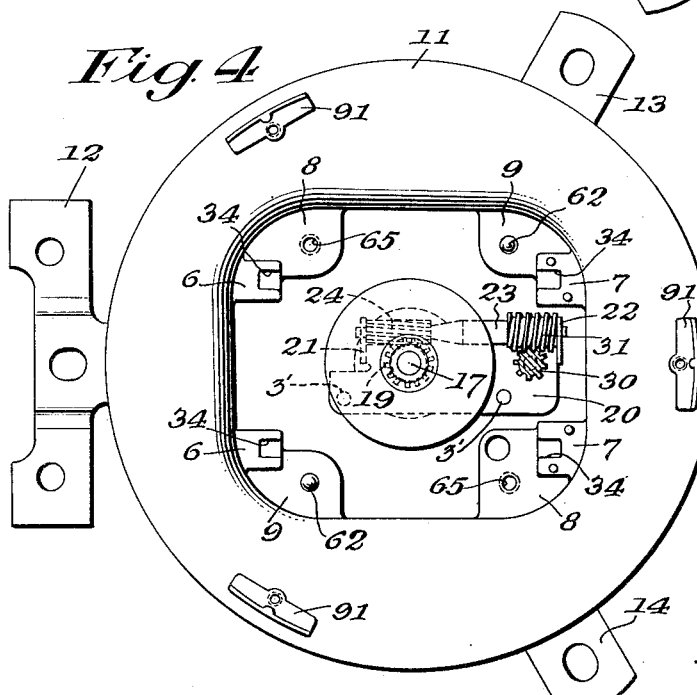
Figure 9:
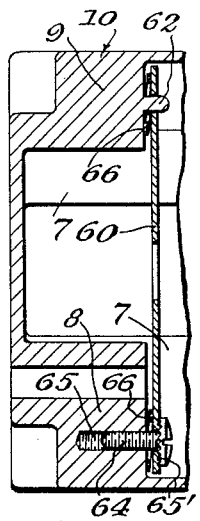

Figs. 5 and 6 are sectional views taken upon the lines 5—5 and 6—6, respectively, of Fig. 1;

Fig. 7 is a top view of the bonnet assembly with some of the parts broken away;

Fig. 8 is a bottom view of the bonnet assembly;

Fig. 9 is a sectional view taken upon the line 9—9 of Fig. 3;

Fig. 10 is a fragmentary similar sectional view of a modified construction; and

Fig. 11 is an enlarged axial sectional view of a portion of the trip odometer.

The embodiment of the invention illustrated in the accompanying drawings comprises a cup-shaped die cast casing 10 of zinc alloy or other suitable material having an outwardly extending flange 11 at its open end. Brackets 12, 13 and 14 may be formed integral with the flange 11 and extend outwardly therefrom for the purpose of securing the speedometer in position in the dash panel of a vehicle. Two spaced pairs of alined posts 6 and 7 are formed on the interior wall of the casing 10 and also two pairs of diametrically oppositely positioned bosses 8—8 and 9—9. The bottom of the casing is provided with a tubular extension 15 providing a bearing 16 for rotatably receiving a drive shaft 17. A magnet 18 is secured upon the inner end of the drive shaft 17 and comprises a cast or molded magnetic material A and a temperature compensating disk D molded integral therewith. The magnetic material A may be an alloy known as Alnico containing as its principal constituents nickel, aluminum, cobalt, and iron. Preferably, such an alloy in finely divided form is molded with a plastic material, such as Bakelite. The disk D may be an alloy of nickel and iron. Immediately below the magnet 18, the drive shaft 17 is provided with a worm 19.

A plate 20 may be secured to the inner surface of the bottom of the casing 10 by pins 3' integral with the casing engaging openings in the plate. The plate is provided with an opening through which the drive shaft 17 may pass. The plate 20 may have upturned ears 21 and 22 providing bearings for rotatably receiving the opposite ends of a shaft 23 which may be formed with an integral worm wheel 24 engaging the worm 19. The plate 20 may also have a pressed-out offset portion 25 providing a bearing for rotatably receiving one end of a vertical shaft 26, the other end of which may be rotatably supported by a bearing formed in a plate 27 extending between and secured to the spaced posts 7—7. The lower end of the shaft 26 is formed with a worm wheel 30 engaging a worm 31 upon the shaft 23. A drive disk 32 secured near the other end of the shaft 26 is provided with a single tooth 33.

Square odometer shafts 35 and 36 extend between posts 6 and 7 with their ends fitting in flat surfaced recesses 34 formed in the top portions of the posts 6 and 7. A trip odometer 37 may be mounted upon the shaft 35 while a total mileage odometer 38 may be mounted upon the shaft 36. The driving connections between the various counter disks of each of the odometers 37 and 38 may be the same. Rotation is transmitted from each disk of lower order to the next disk of higher order, as illustrated in Fig. 11 which shows the trip odometer. The left-hand hub of each disk 3 (Fig. 11) is provided with a two-toothed pinion 4 adapted to engage a pinion 5 carried by a disk 98 having a square hole 99 fitting the shaft 35 and preventing rotation of the disk 98. The pinion 5 engages a complete gear 100 on the right-hand hub of the next disk 3.

The disk 32 is arranged so as to rotate in a single direction so that the tooth 33 thereon will alternately engage the wheels 41 and 43 and drive the same. Wheel 43 is mounted upon one end of a sleeve 2 which is mounted for rotation upon the shaft 35. The sleeve 2 extends into and provides a bearing for rotation and axial movement of a sleeve 45. A wheel 46 is secured upon one end of the sleeve 45 and is provided with a plurality of pins 47 adapted to engage complementary openings in the wheel 43 for the purpose of clutching the wheels 43 and 46 for rotation in unison. The other end of the sleeve 45 is provided with clutch jaws 39 which embrace the flattened right-hand hub 44 of the lowest order disk 3. Wheel 41 is secured upon sleeve 40 which is rotatably mounted upon shaft 36. Sleeve 40 has a driving connection with odometer 38 the same as that between sleeve 45 and odometer 37. A spring 48 surrounds the shaft 35 and tends to urge the pins 47 on the wheel 46 into engagement with the corresponding openings in the face of the wheel 43.

A manually operable reset shaft 50 is mounted for rotation and axial movement in a bearing formed in the casing 10 and is arranged so that its rounded inner end may engage the inclined surface 51 of the sleeve 45 so as to move the wheel 46 axially out of driving engagement with the wheel 43 and into driving relation to a wheel 52 carried upon the shaft 50 near its inner end. The shaft 50 is provided with spaced annular grooves 53 adapted to be engaged and held in adjusted axial position by a spring clip 54 which projects from and is suitably secured to the outer surface of the casing 10.

A bonnet assembly B may be supported upon the shoulders formed by tops of the bosses 8—8 and 9—9 and may comprise a plate 60 of magnetic material, such as steel, having a pair of guide openings 61 adapted to engage pins 62 projecting upwardly from the tops of the bosses 9. The plate 60 also is preferably provided with openings 63 through which screws 64 or 64' may pass and engage threaded openings 65 or 65'' formed in the posts 8. The heads of the screws 64 are each provided with a radially-corrugated or knurled under-surface adapted to engage the correspondingly corrugated or knurled adjacent plate surface 65' surrounding each of the openings 63. A spring washer 66, inserted between the plate 60 and each of the shoulders 8 and 9, urges the juxtaposed corrugated surfaces into interlocking engagement, preventing subsequent accidental turning of the screws 64, which might otherwise occur due to vibration of the instrument in actual use. Such accidental turning of screws 64 would impair the accurate calibration of the instrument by permitting variation in the length of the air gap.

One end of a tube 70 is fixed in a central opening in the plate 60, and the other end of this tube is provided with an apertured plug 71 providing a bearing for rotatably receiving an indicator shaft 72. A strip 73 of non-magnetic material may be secured at its ends to the bottom surface of the plate 60 by spot welding and provides an end bearing 75 for the indicator shaft 72. A disk 76 of non-magnetic material, such as aluminum, is secured to the indicator shaft 72 so as to be freely rotatable in the space between the strip 73 and the bottom surface of the plate 60. A lever 80 is provided with an intermediate aperture surrounding the indicator shaft 72 and is clamped to the top end of the tube 70 by a nut 69. A spiral coil spring 81 surrounds the shaft 72 and has one end secured relative thereto while its other end is secured to the upturned portion 82 of the lever 80. Speed-indicating means 78, such as a disk, may be secured to the indicator shaft 72.

Preferably, the disk 78 is made from styrol and an annular rim portion thereof is rendered opaque except in those portions thereof bearing numerals 86 which are colored and transparent and are representative of different rates of speed. The numerals representative of lower speeds up to say 50 miles per hour may be in one color, such as green, while the numerals representative of higher speeds, such as above 50 miles per hour, may be in another color, such as red. A plate 90 may be secured by screws 92 to bosses 91 projecting upwardly from the flange 11 and is provided with openings 93, 94 and 95 above the odometers 38, 37 and the path of movement of the numerals 86, respectively. A light bulb 84 is fitted in a socket 83 which is detachably secured in an opening 85 in the flange 11. The bulb 84 is arranged to throw light rays upon the transparent colored numerals 86. The plate 90 is enclosed within a face cover comprising an annular metal ring 96 carrying a glass disk 97.

In the modified construction shown in Figure 10, the adjusting screw 64' for the bonnet plate 60' is secured within a threaded hole 65'' which passes entirely through the boss or post 8' and the wall of the casing 10', the inner end of the screw 64' being provided with keying or seizure means, such as a square socket 99 adapted to receive a socket wrench inserted from outside the casing, so that the screw 64' may be easily turned from without, for calibration purposes, when direct access to the screw head is obstructed by subsequently-assembled parts, as is the case when the instrument has been completely assembled. By reason of the foregoing construction, the instrument may be quickly and easily calibrated while the magnet is rotating within the fully-assembled instrument.

It will be noted that the casing 10 is provided with various locating means which receive the various parts and assure the accurate location of the various parts with respect to one another. Thus, the pins 3', which engage openings in the plate 20, assure accurate location of the shaft 23 and its gears 24 and 31 with respect to the gears 19 and 30. Likewise, the recesses 34 formed in the casing and which receive the square odometer shafts 35 and 36 assure that the odometer disks 37 and 38 will be accurately located behind and in registration with the plate openings 94 and 93 respectively, with the plate 90 itself being accurately located by means of the bosses 91 cast integral with the casing 10.

In the operation of the device, movement of the vehicle causes the drive shaft 17 to rotate, and this rotary movement of the drive shaft is transmitted through the shafts 23 and 26 to the one-tooth drive disk 32, rotating the latter in one direction only. As the disk 32 rotates, the single tooth 33 thereon intermittently alternately engages the wheels 41 and 43 to rotate the same and this rotation is transmitted to the trip odometer and the mileage odometer.

Rotation of the drive shaft 17 causes rotation of the magnet 18. Flux from revolving magnet 18 cuts the aluminum disk 76 causing eddy currents to flow in the disk. The field or magnetic flux set up by these induced eddy currents reacts with the primary flux of the magnet causing a torque on the disk urging it to rotate in the same direction as the magnet. This torque is proportional to the speed of the rotating magnet and is balanced by the restraining torque of spring 81. Consequently, as the speed of the magnet changes, the disk 76 is moved a corresponding amount but remains stationary when the speed of the magnet is uniform. This movement of the disk 76 is transmitted through the indicator shaft 72 to rotate the dial disk 78 a corresponding amount, thus causing the numerals 86 to be brought successively opposite the opening 95 in the plate 90.

The speed-indicating means of the instrument may be set at zero by turning the lever 80 to adjust the tension of the coil spring 81. The instrument may be accurately calibrated by turning the screws 64 or 64' to adjust the position of the plate 60 with respect to the magnet 18 to obtain the desired air gap therebetween. This is possible in the instrument of the invention because the number of lines of magnetic flux which flow between the magnet 18 and the plate 60 and cross the aluminum disk 76 varies with the air gap between the plate 60 and the magnet 18.

In calibrating instruments of this general character prior to the present invention, it has been necessary either (1) to demagnetize the magnet to bring it to the proper strength or (2) to precalibrate the various parts essential to accurate calibration. In accordance with the present invention, by employing a powerful magnet it is possible to employ simple light weight movable parts and lessen the possibility of the various parts being out of balance and making it possible to calibrate the instrument easily and quickly merely by adjusting the air gap between the magnet and the plate of magnetic material, and in which air gap the rotatable disk 76 is positioned.

The metal strip 73 is an alloy of non-magnetic material which can be spot welded to the magnetic disk 60 and is sufficiently wear-resistant so that it provides a good end bearing for the indicator shaft 72.

Inasmuch as the numerals 86 are transparent and the portion of the disk immediately adjacent thereto is opaque, the light rays from the electric bulb 84 will pass through the numerals and the latter will be illuminated as viewed through the opening 95 in the plate 90.

It will be understood by those skilled in the art that the magnetic material A of the magnet 18 may be any material having high coercive force. The specific material described possesses a moderately high coercive force of about 500 oersteds.

Due to the presence of the temperature-compensating disk D, the instrument when once calibrated will thereafter give correct readings notwithstanding changes in temperature. Thus, as will be readily understood by one skilled in this art after having read the foregoing description, the hereinabove-disclosed instrument is self-compensating, and will itself automatically exclude any errors which would otherwise normally be introduced by changes in temperature. Suppose, for example, that the instrument, after having been correctly calibrated for one temperature, is subjected or exposed to a much higher temperature. This higher temperature appreciably increases the electrical resistance of the non-magnetic disk 76 through which the induced eddy currents flow, thereby decreasing the magnitude of these eddy currents, and with it the strength or magnitude of the eddy-current-produced counter-flux, which reacts with the primary flux of the rotating magnet A to provide the torque acting on disk 76. As a result, this temperature increase, if uncompensated, would decrease the torque acting on the disk 76, causing the indicator means associated with said disk to indicate a value lower than the correct value. However, the flux-conducting nickel-iron alloy disk D bridges or spans the diametrically-opposed north and south magnetic poles of the magnet 18 in the manner of a magnetic shunt, thereby constantly by-passing a predetermined portion of the total lines of flux flowing from one magnet pole to the other. This by-passed portion of the total magnet flux is magnetically noneffective and contributes nothing to the torque acting on the disk. The permeability, or flux-conducting ability of this flux-shunting nickel-iron alloy disk D (on which depends the amount of flux which will be by-passed therethrough) varies inversely with ambient temperature changes. In the given instance, the assumed increase in temperature will reduce the permeability of the disk D, thereby reducing the amount of flux by-passing therethrough, and thus leaving a relatively greater portion of the constant total flux passing between magnet poles available for torque production purposes. This decrease in shunted flux increases the unshunted flux acting on disk 76, thereby increasing the magnitude of the torque acting on said disk, which compensates for the decrease in torque occasioned by the temperature-induced rise in the electrical resistance of the disk 76. If the constants selected are of proper magnitudes, one change will so nearly neutralize the other as to leave the net reading of the instrument unaffected by either, and therefore corrected for temperature.

While the invention has been described specifically with reference to a speedometer for automobiles, it will be understood by those skilled in the art that the invention includes features which are equally applicable to various other instruments, such as tachometers, fuel indicators and other indicating devices.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. In an indicating device, a casing, a rotatable permanent magnet therein, a plate of magnetic material adjustably supported inside said casing, manually-operable calibration adjustment-means, accessible from without said casing and operable during rotation of said magnet, for moving said adjustable plate towards and away from said magnet, said plate thereafter remaining at its adjusted distance from said magnet, a rotatable disk of non-magnetic material disposed intermediate said magnet and said plate and axially fixedly related to said adjustable plate, thereby to move jointly therewith as the plate is moved towards or away from said magnet, and speed-indicating means operatively associated with said disk.

2. In an indicating device, a casing, a rotatable permanent magnet therein, a plate of magnetic material inside said casing adjustable towards and away from said magnet, said plate thereafter remaining at its adjusted distance from said magnet, a rotatable disk of non-magnetic material disposed intermediate said magnet and said plate and axially fixedly related to said

CERTIFICATE OF CORRECTION.

Patent No. 2,273,848.   February 24, 1942.

FREDERICK W. ELY, ET AL.

It is hereby certified that error appears in the printed specification of the above numbered patent requiring correction as follows: Page 4, second column, line 4, claim 6, and line 14, claim 7, for "a dial" read --an indicator--; and lines 6 and 16, same claims 6 and 7, strike out "dial"; line 19, claim 7, for "magnetic material" read --high retentivity or coercive force--; and line 20, same claim, after "binder" insert --intimately--; and that the said Letters Patent should be read with this correction therein that the same may conform to the record of the case in the Patent Office.

Signed and sealed this 23rd day of June, A. D. 1942.

Henry Van Arsdale,
Acting Commissioner of Patents.

(Seal)